United States Patent
Wakeford et al.

(10) Patent No.: US 9,448,634 B1
(45) Date of Patent: Sep. 20, 2016

(54) SYSTEM AND METHOD FOR PROVIDING REWARDS TO A USER IN A VIRTUAL SPACE BASED ON USER PERFORMANCE OF GESTURES

(71) Applicant: KABAM INC., San Francisco, CA (US)

(72) Inventors: Kent Wakeford, Hillsborough, CA (US); Clifford J. Harrington, San Francisco, CA (US)

(73) Assignee: KABAM, INC., San Francisco, CA (US)

( * ) Notice: Subject to any disclaimer, the term of this patent is extended or adjusted under 35 U.S.C. 154(b) by 683 days.

(21) Appl. No.: 13/798,008

(22) Filed: Mar. 12, 2013

(51) Int. Cl.
G06F 3/01 (2006.01)
G06F 3/00 (2006.01)

(52) U.S. Cl.
CPC ................................. G06F 3/017 (2013.01)

(58) Field of Classification Search
None
See application file for complete search history.

(56) References Cited

U.S. PATENT DOCUMENTS

| | | | | |
|---|---|---|---|---|
| 5,590,219 | A | 12/1996 | Gourdol | 382/202 |
| 2008/0126937 | A1* | 5/2008 | Pachet | G06F 3/017 715/720 |
| 2010/0208038 | A1 | 8/2010 | Kutliroff et al. | 348/46 |
| 2011/0151974 | A1* | 6/2011 | Deaguero | G06F 3/017 463/37 |
| 2011/0289456 | A1* | 11/2011 | Reville | G06F 3/017 715/830 |
| 2011/0314381 | A1* | 12/2011 | Fuller | G06F 3/017 715/727 |
| 2012/0131518 | A1* | 5/2012 | Lee | G06F 3/011 715/863 |
| 2012/0192220 | A1* | 7/2012 | Wyatt | G06Q 30/0275 725/30 |
| 2012/0214594 | A1* | 8/2012 | Kirovski | A63F 13/06 463/36 |
| 2012/0225719 | A1 | 9/2012 | Nowozin et al. | 463/36 |
| 2012/0306745 | A1 | 12/2012 | Moore et al. | 345/158 |
| 2013/0097565 | A1* | 4/2013 | Freeding | G09B 7/02 715/863 |
| 2013/0167085 | A1* | 6/2013 | Roundtree | G06Q 30/0207 715/810 |
| 2013/0218688 | A1* | 8/2013 | Roos | G06F 17/30061 705/14.69 |
| 2013/0296057 | A1* | 11/2013 | Gagner | G06F 3/017 463/37 |
| 2014/0043230 | A1* | 2/2014 | Galor | G06F 3/005 345/156 |
| 2014/0145942 | A1* | 5/2014 | Kuno | G06F 3/017 345/156 |
| 2014/0215407 | A1* | 7/2014 | Ahmed | G06F 3/017 715/850 |
| 2014/0316763 | A1* | 10/2014 | Tardif | G06F 3/017 704/3 |

* cited by examiner

Primary Examiner — Toan Vu
(74) Attorney, Agent, or Firm — Sheppard Mullin Richter & Hampton LLP

(57) ABSTRACT

A system and method for providing rewards to a user in a virtual space based on the user performance of gestures is disclosed. Gesture parameters may be obtained for physical actions performed by virtual space users in the real world. Gestures and corresponding gesture commands in the virtual space may be identified based on the gesture parameters. User performance of an identified gesture may be qualified by one or more gesture metrics. The gesture metrics may be determined based on the obtained gesture parameters. Access to reward content may be provided to the user based on user performance of the identified gestures as qualified by the determined gesture metrics.

14 Claims, 3 Drawing Sheets

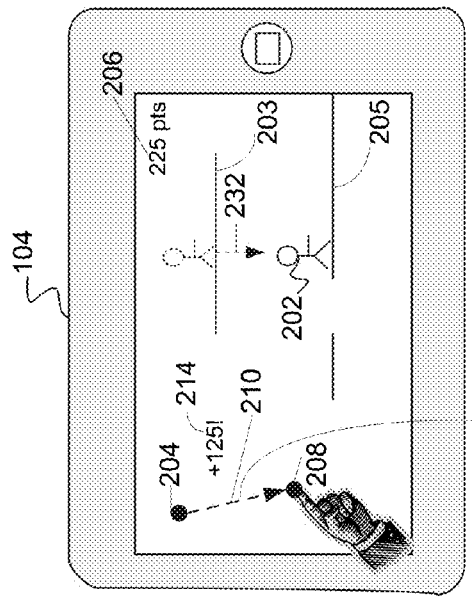
FIG. 2A
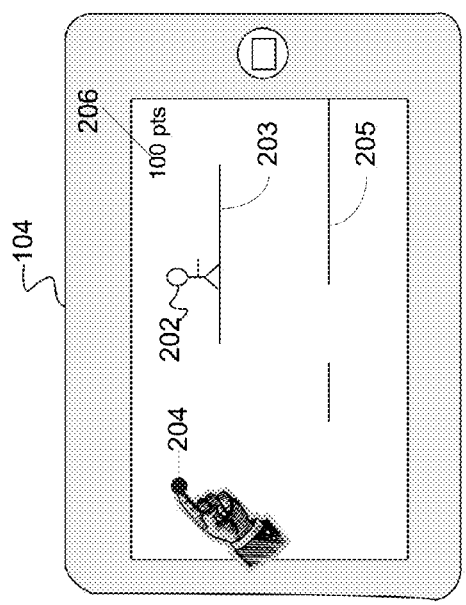
FIG. 2B
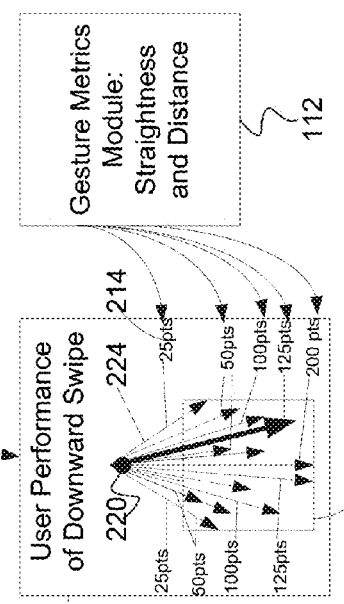
FIG. 2C
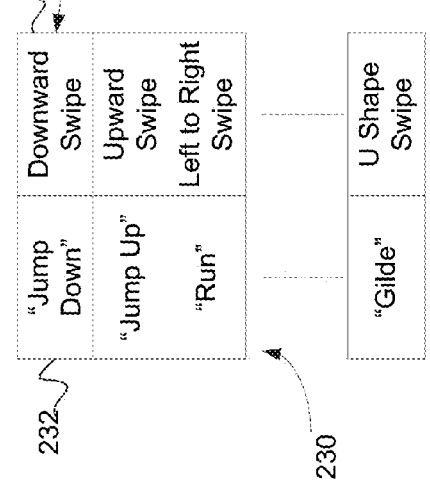

SYSTEM AND METHOD FOR PROVIDING REWARDS TO A USER IN A VIRTUAL SPACE BASED ON USER PERFORMANCE OF GESTURES

FIELD OF THE DISCLOSURE

This disclosure relates to providing rewards to a user in a virtual space base on gestures of the user, the rewards including controls and/or content in the virtual space.

BACKGROUND

Systems that use human gestures as inputs are known. In those systems, a user action may be captured by sensors or cameras and recognized as a gesture input using a dictionary compiled with definitions of standard gestures. For example, a gesture input may be recognized upon a determination that a probability of a user's finger movement on a touch sensitive screen matching a gesture definition provided by the dictionary has exceeded a predetermined probability.

Systems that require users to successfully perform defined gestures are known. In those systems, a user may be required to perform a defined gesture for a number of times in a training mode before the user may proceed with the systems. For example, a user may be required to perform a finger swipe in a defined upward motion (e.g., to initiate a "jump") for three times in a game tutorial.

SUMMARY

One aspect of the disclosure relates to providing reward content in a virtual space based on user performances of identified gestures. Qualities of user performances of identified gestures may be quantified by one or more gesture metrics. Reward contents may be provided to users in the virtual space based on such gesture metrics. The reward content may include new virtual space controls, virtual items, virtual currency, invitation to participate in missions, quests, campaign and/or any other events in the virtual space, real-world items, real-world currency and/or any other reward content. This may incentivize users to improve performance of the identified gestures. Simultaneously and alternative, this may enhance user virtual space experience by providing new virtual space controls once users have performed the identified gestures with qualities.

In some implementations, a system configured to provide rewards to a user in a virtual space based on user performance of a gesture may include a server. The server may operate in a client/server architecture with one or more client computing platforms. The client computing platforms may be associated with the users of the virtual space. The server may be configured to execute one or more of a space module, a gesture identification module, a gesture-command module, a gesture metrics module, a reward module, a gesture-reward threshold module, and/or other modules.

The space module may be configured to execute an instance of a virtual space. The space module may implement the instance of the virtual space to facilitate participation by users in the virtual space by providing state information about the virtual space and transmitting the state information to client computing platforms associated with the users. The virtual space state information may be used to facilitate presentation of views of the virtual space to the users on the client computing platforms. The users may participate in the virtual space by controlling one or more elements within the virtual space. User may specify such controls through commands, which may be executed in the virtual space.

The gesture identification module may be configured to obtain gesture parameters that represent physical actions of users in the real world. This may involve analyzing captured user physical actions in the real world and obtaining one or more gesture parameters representing the user physical actions. The analysis may involve image, motion, location analysis and/or any other analyses. Responsive to the gesture parameters obtained, the gesture identification module may be configured to identify gestures based on the obtained gesture parameters. In some examples, this may involve comparing the obtained gesture parameters with gesture definitions compiled by a provider, administrator, moderator, and/or any other entities related to the virtual space.

The gesture-command module may be configured to determine gesture commands corresponding to gestures identified by the gesture-identification module. Gesture commands may be executed in the virtual space to facilitate user participation in the virtual space upon an identification that associated gestures have been performed by users by the gesture identification module. Gesture commands may specify maneuvers to be performed by virtual space elements and/or other user interactions with the virtual space. In some examples, gesture commands may be associated and dissociated with corresponding gestures dynamically. The gesture command module may be configured to determine that a first gesture command corresponds to a first gesture responsive to a first action by a first user identified as the first gesture by the gesture identification module.

The gesture metrics module may be configured to determine one or more gesture metrics based on gesture parameters obtained by the gesture identification module. The gesture metrics may quantify one or more qualities of user performance of the identified gestures. Examples of gesture metrics may include accuracy with respect to the identified gestures, precision, speed, style, power, direction, duration, and/or any other gesture metrics. A gesture metric that quantifies a performance of an identified gesture by a user may be determined by comparing gesture parameters obtained from the user performance with those specified in a gesture definition for the identified gesture, information indicating historical performances of the identified gesture, a style specification for the identified gesture, and/or any other sources. Responsive to a user performance of a first gesture, the gesture metrics module may be configured to determine a first metric for the first user's performance of the first gesture based on the gesture parameters obtained for the first action by the first user.

The gesture reward module may be configured to provide access to reward content in the virtual space based on gesture metrics determined by the gesture metrics module. Examples of reward content may include virtual items, virtual currency, virtual space controls, invitation to virtual space events, real-world items, real-world currency and/or any other reward content. In some implementations, an access to a first set of reward content may be provided to the first user responsive to a determination that the first gesture metric determined for performance of the first gesture by the first user has breached a first threshold.

The gesture-reward threshold module may be configured to obtain one or more thresholds base on which the access to reward content may be provided to users. The thresholds may correspond to accuracy, average accuracy, a speed, an average speed, a number of correct gestures performed, a score, an average score with respect user performance of identified gestures and/or any other aspects relating to user performance of identified gestures.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

FIGS. 2A-C illustrate one example of providing rewards to user in a virtual space based on user performance of gestures.

DETAILED DESCRIPTION

Figure 1:
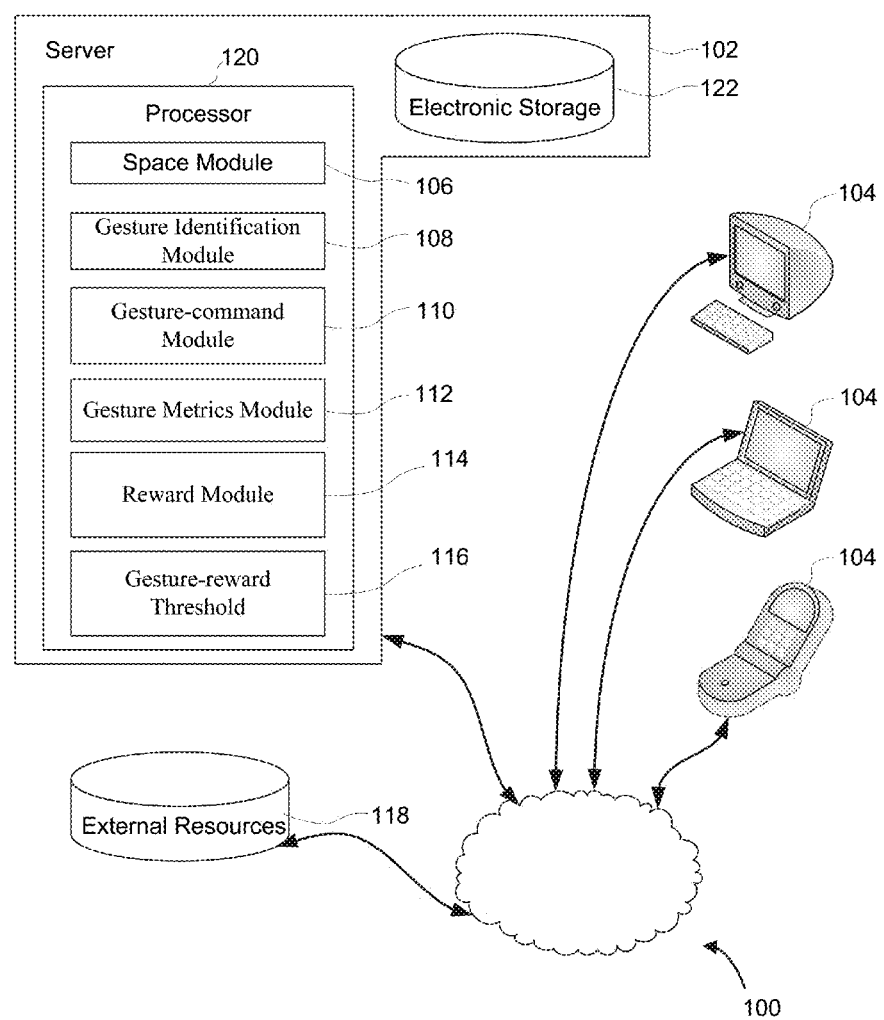
FIG. 1 illustrates one example of a system configured to provide rewards to a user in a virtual space based on user performance of gestures.

FIG. 1 illustrates one example of a system configured to provide rewards to a user in a virtual space based on user performance of gestures. For determinations of user performance of gestures, user physical actions in the real world may be captured and analyzed to obtain one or more gesture parameters representing the user physical actions. The obtained gesture parameters may be used to identify gestures based on gesture definitions; and the identified gestures may be used to determine gesture commands corresponding to the identified gestures. The gesture commands may be executed in the virtual space to effectuate user initiated virtual space maneuvers and/or other user interactions with the virtual space. The obtained gesture parameters may be used to determine one or more gesture metrics, which may quantify one or more qualities of user performance of the identified gestures. Based on such gesture metrics, access to reward content may be provided to users to incentivize users to improve performance of the identified gestures. In some implementations, gesture commands corresponding to the identified gestures may be associated with new gestures upon a determination that user performance of the identified gestures has breached one or more thresholds. Accordingly, this may enhance user experience with the virtual space.

In some implementations, system 100 may include a server 102. The server 102 may be configured to communicate with one or more client computing platforms 104 according to a client/server architecture. The users may access system 100 and/or the virtual space via client computing platforms 104. Server 102 may be configured to execute one or more computer program modules. The one or more computer program modules may include one or more of a space module 106, a user module 108, a group assignment module 110, a purchase information module 112, a purchase analysis module 114, a target module 115, an offer module 116, and/or other modules.

Space module 106 may be configured to implement an instance of the virtual space executed by the computer modules. The instance of the virtual space may reflect the state of the virtual space. The instance of the virtual space may be used to push state information to clients for implementation on the clients, may be used to verify state information generated on clients executing expressions of the instance locally, and/or for other purposes. State information may include information about the state of the virtual space such as, without limitation, position information of one or more objects, topography information, object status/shape information, battle information, score information, user or character progress information, user inventory information, progress information for one or more activities or actions, view information describing a view of the virtual space, and/or other information that describes the state of the virtual space. Expressions of the instance executed on the clients facilitate presentation of views on the clients of the virtual space. Expressions of the instance executed on the clients may be configured to simply present views of the virtual space based on the state information (e.g., via streaming view information, object/position information, and/or other state information) received from space module 106. Expressions of the instance executed on the clients may include space logic that effectively provides for execution of a limited version of the instance on a client that is synchronized and/or verified with state information received from space module 106. The view presented on a given client may correspond to a location in the virtual space (e.g., the location from which the view is taken, the location the view depicts, and/or other locations), a zoom ratio, a dimensionality of objects, a point-of-view, and/or view parameters. One or more of the view parameters may be selectable by the user.

The instance of the virtual space may comprise a simulated space that is accessible by users via clients (e.g., client computing platforms 104) that present the views of the virtual space to a user. The simulated space may have a topography, express ongoing real-time interaction by one or more users, and/or include one or more objects positioned within the topography that are capable of locomotion within the topography. In some instances, the topography may be a 2-dimensional topography. In other instances, the topography may be a 3-dimensional topography. The topography may include dimensions of the space, and/or surface features of a surface or objects that are "native" to the space. In some instances, the topography may describe a surface (e.g., a ground surface) that runs through at least a substantial portion of the space. In some instances, the topography may describe a volume with one or more bodies positioned therein (e.g., a simulation of gravity-deprived space with one or more celestial bodies positioned therein). The instance executed by the computer modules may be synchronous, asynchronous, and/or semi-synchronous.

The above description of the views of the virtual space determined from the instance executed by space module 106 is not intended to be limiting. The virtual space may be presented in a more limited, or richer, manner. For example, views of the virtual space may be selected from a limited set of graphics depicting an event in a given place within the virtual space. The views may include additional content (e.g., text, audio, pre-stored video content, and/or other content) that describes particulars of the current state of the place, beyond the relatively generic graphics. For example, a view may include a generic battle graphic with a textual description of the opponents to be confronted. Other representations of individual places within the virtual space are contemplated.

Within the instance of the virtual space executed by space module 106, users may control characters, objects, simulated physical phenomena (e.g., wind, rain, earthquakes, and/or other phenomena), and/or other elements within the virtual space to interact with the virtual space and/or each other. The user characters may include avatars. As used herein, the term "user character" may refer to an object (or group of objects) present in the virtual space that represents an individual user. The user character may be controlled by the user, with which it is associated. The user controlled element(s) may move through and interact with the virtual space (e.g., non-user characters in the virtual space, other objects in the virtual space). The user controlled elements controlled by and/or associated with a given user may be created and/or customized by the given user. The user may have an "inventory" of virtual goods and/or currency that the user can use (e.g., by manipulation of a user character or other user controlled element, and/or other items) within the virtual space.

The users may participate in the instance of the virtual space by inputting commands through client computing platforms 104. The commands may specify virtual space maneuvers and/or other user interactions with the virtual space. The commands may be executed in the virtual space such that the user requested interactions with the virtual space may be effectuated in the virtual space. For example, a user command may specify a virtual space maneuver (e.g., thrusting a sword) to be performed by a knight in the virtual space; upon the execution of the user command in the virtual space, the knight may be caused to perform a motion expressing sword thrusting.

The gesture identification module 108 may be configured to obtain gesture parameters that represent physical actions of users in the real world. Such physical actions may be performed by users in a 2D (e.g., on a touch sensitive screen) or a 3D space in the real world (e.g., in an area monitored by sensors). Physical actions of users may be captured by client platform 104, via devices coupled to or included in client platform 104, such as, touch sensitive screens, sensors, cameras, GPS positioning devices, tracking device such as markers, transponders, and/or any other devices that may be used to capture physical actions of users in the real world. The captured user physical actions in the real world may include finger and/or stylus movements on a touch sensitive screen, bodily motion in an area of interest (e.g., a specific area within a sensing range of a motion sensor, a specific area within a range of a camera, and so on), and/or any other physical actions of users. In some examples, user physical actions in the real world may be performed through objects held by users, such as, but not limited to, a stylus, wireless game controller, remote control, tracking device and/or any other objects. For example, a user may perform a golf swing using a golf club to initiate a simulated golf swing in a game.

In any case, the user physical actions may be captured and tracked, for example, through various positions of body parts of users, e.g., head, neck, palm, knee, back, legs, arms, feet and so on and/or positions of objects held by users, e.g., tip point of a stylus moving on a touch-sensitive screen, shaft, shoe, back, and/or face positions of a golf club, and so on. Gestures parameters represent such user physical actions may be obtained by analyzing the tracked positions of user body parts and/or objects held by users over a period of time.

For example, for obtaining gesture parameters of a waving action performed by a user, a position of a user's palm in a 3D space at an early time may be compared with another position of the user's palm at a later time; for obtaining gesture parameters of a finger or stylus movement performed by a user on a touch sensitive screen, a position of user thumb or stylus on a touch sensitive screen at an earlier time may be compared with another position of the user's thumb or stylus on the touch sensitive screen at a later time; for obtaining gesture parameters of a golf swing performed by a user, positions of various parts of golf club held by a user at an earlier time may be compared with positions of the parts of golf club held by the user at a later time; and so on.

In any case, through an analysis of tracked positions of user body and/or objects held by the user over a period of time, a relative direction, distance, rotation, motion speed, course, power and/or any other gesture parameters with respect to a user physical action in the real world may be determined. For example, a speed of user's waving action over a period of time, a direction of the waving action, a distance of the waving action, rotation, power of the waving action, and/or any other gesture parameters of the user's waving action in the real world may be so obtained. In another example where the user performs a golf swing, the speed, distance, course, direction of movements of user's head, neck, shoulder, ankle, knee and/or other user body parts may be obtained; and/or the golf club's shoe movement, speed, rotation of the gold club's back, shaft and/or other gesture parameters with respect to the golf swing action performed by the user may be obtained.

In some examples, the analysis for obtaining gesture parameters of user physical actions may include image, motion, optical, location, thermodynamic, photogrammetric, biomechanics analysis and/or any other analyses. For example, in the case where user physical actions are captured on images over a time, image analysis may be performed to identify bodily positions of interest in individual images, and gesture parameters may be obtained by determining the movement of identified bodily positions over the time using image as well as motion analysis.

Responsive to the gesture parameters obtained, the gesture identification module 108 may be configured to identify gestures based on the obtained gesture parameters. In some examples, for such gesture identifications, the gesture identification module 108 may be configured to consult gesture definitions, which may be compiled by a provider, administrator, moderator and/or any other entity related to virtual space and stored in electronic storage of system 100, such as the electronic storage 122. Simultaneously or alternatively, such gesture definitions may be provided by third party gesture definition providers affiliated with the virtual space. In any case, in those examples, the gesture definitions may specify positions of body parts indicating standard gestures and/or gestures defined by the provider, administrator, moderator, and/or any other entities of the virtual space. For example, a gesture definition of sideway waving may specify starting position and end position of a person's palm should form a straight line parallel or near parallel to shoulders of the person, who is performing the waving; as such, the waving gesture definition, for example, may further specify a minimum and/or maximum acceptable distances between the two palm positions, the orientations of the two palm positions relative to each other, a minimum and maximum speeds of the waving, a minimum and/or maximum degrees of the line formed by the two palm positions with respect to shoulders, and so on. By consulting such a gesture definition, the gesture identification module 108 may determine a user physical action of waving may be identified as a sideway waving gesture based on the obtained gesture parameters: for example, the obtained gesture parameters may indicated palm positions of the user form a line having a degree of rotation relative to shoulders of the user within the minimum and maximum degrees as specified by the sideway waving gesture definition, the speed of the user palm motion as indicated by the user palm positions is within the minimum and maximum speeds specified by the sideway waving gesture definition, the distance of the user palm motion as indicated by the user palm positions is within the minimum and maximum distances specified by the sideway waving gesture definitions, and so on.

In some examples, for identifications of user physical actions as gestures, the gesture identification module 108 may be configured to construct the gestures directly based on the gesture parameters obtained. For example, for an identification golf swing gesture, the golf swing gesture may be constructed by various positions of user body parts and parts of the golf club held by the user as captured and tracked over a period of time. In some cases, such constructed gestures may be directly used as an identified gesture corresponding to a user physical action without consulting gesture definitions. E.g., the constructed golf swing by the gesture identification module 108 may be identified as a golf swing gesture as is without comparing it with a standard gesture definition for golf swing.

The gesture-command module 110 may be configured to determine gesture commands corresponding to gestures identified by the gesture-identification module 108. A gesture command may specify a virtual space maneuver, view transformation, information presentation and/or any other user interactions with the virtual space. For example, a gesture command, corresponding to an identified "throwing" gesture by a user in a 3D space in the real world, may specify that an avatar controlled by the user throws an object held in the avatar's hands; a gesture command, corresponding to an identified gesture of finger swipe up-down on a touch sensitive screen may specify that an avatar controlled by the user perform a slide in the virtual space; a gesture command, corresponding to an identified gesture of waving side way from left to right may specify that a view of virtual space being presented on the client platform 104 should move from left to right; and so on. In some examples, a gesture command corresponding to an identified user gesture may specify simulated physical forces according to such a gesture. For instance, in the case where a golf swing performed by a user is identified, the gesture command corresponding to an identified golf swing gesture (e.g., constructed directly from gesture parameters representing the golf swing performed by the user in the real world) may specify a simulated golf swing to be performed in the virtual space according to the physical forces applied by the golf swing performed by the user in the real world.

In any case, gesture commands may be associated with corresponding gestures such that when the gestures are identified as being performed by users by the gesture identification module 108, the corresponding gesture commands will be executed in the virtual space. Such associations may be generated by the provider, administrator, moderator, and/or any entity related to the virtual space at a configuration stage of the gesture-command module 110. For example, a gesture of a finger tap on a touch sensitive screen may be associated with a gesture command instructing a "jump" of user avatar in the virtual space such that when the command is executed in the virtual space, the user avatar jumps suddenly. In some examples, such associations may be modified during a run-time of system 100 by the gesture-command module 110. For example, the "jump" gesture command may be associated with a gesture of finger swipe in a straight down to up motion and stopped to being associated with the finger tap motion dynamically by the provider of the virtual space. That is, a gesture command may be reconfigured to be associated with a new gesture and disassociated with a previously associated gesture dynamically during a run-time of the system 100 by the gesture-command module 110.

The gesture metrics module 112 may be configured to determine one or more gesture metrics based on gesture parameters obtained by the gesture identification module 108. A user performance of a gesture identified by gesture identification module 108 may be quantified by one or more gesture metrics. Examples of such gesture metrics may include accuracy with respect to the identified gesture, precision, speed, style, power, direction, duration, and/or any other gesture metrics. For example, a user performance of an identified sideway waving gesture may be quantified by gesture metrics, such as, accuracy measured by straightness of the waving action based on a gesture definition for the sideway waving gesture, precision with respect to previous sideway waving gesture performed by the user, the speed of the waving action performed by the user, distance of the waving and/or any other gesture metrics quantifying the sideway waving gesture based on the gesture parameters obtained for the user action identified as the sideway waving gesture.

A gesture metric that quantifies an accuracy of user performance of an identified gesture may be determined by comparing the gesture parameters obtained from the user performance with a gesture definition for the identified gesture. For such a determination, the gesture definition for the identified gesture may be consulted by the gesture metrics module 112; gesture parameters, such as distance of the user performed gesture, area of interest where user perform the gesture, relative positions of body parts of the user in performing the gesture, and so on may be compared with those specified in the gesture definition for the identified gesture; and accuracy score, points, percentage of completion, and/or any other measurements may be assigned to the gesture metric to quantify accuracy of the user performance of the identified gesture. For example, an accuracy gesture metric for user performance of a sideway waving action may be determined by comparing the obtained gesture parameters such as the straightness, distance, speed, area of interest where the user waving action was performed and/or any other obtained gesture parameters of the waving action as performed by the user with a corresponding definition of a sideway waving gesture. For instance, such an accuracy gesture metric may be determined by computing a standard deviation between the obtained gesture parameters and the gesture definition of the identified gesture. A score, points, percentage, rate, quality, and/or any other measurement units may be determined for quantifying an accuracy of user performance of an identified gesture: e.g., 85% accurate, 4 stars out of 5 stars, 70 percent complete and so on.

A gesture metric that quantifies a precision of the user performance of an identified gesture may be determined by comparing the gestures parameters obtained from a user performance of an identified gesture with those of previous performances of the identified gestures by the user. For such a determination, historical information quantifying user performances of the identified gestures at different times may be recorded, e.g., in the electronic storage 122. Such historical information of user performance of the identified gesture may be consulted by the gesture metrics module 112 for a determination of precision of a current performance of the identified gesture by the user. For example, in the case where a user performance of a sideway waving gesture is being quantified by a precision gesture metric, the straightness, distance, speed, and/or any other obtained gesture parameters for the waving action as performed by the user may be compared with those indicated by the corresponding historical information indicating user's performances of such a sideway waving gestures in the past. In some examples, a deviation between the obtained gesture parameters and the historical information of the identified gesture may be computed for a determination of the gesture metric of precision. Precision value (e.g., +0.5 inch in distance as compared to historical performances, −1.3 degree in straightness as compared to historical performances, and so on) may be determined for the current performance of the identified gesture by the user based on the computed deviation. In some examples, the obtained gesture parameters for the current performance may be aggregated into the historical information for determinations of precision gesture metrics to be determined for future performances of the identified gesture by the user.

A gesture metric that quantifies a style of the user performance of an identified gesture may be determined by comparing the gestures parameters obtained from a user performance of the identified gesture with style specifications for the identified gesture. One or more style specifications for an identified gesture may be determined by provider, administrator, moderator, and/or any other entities related to the virtual space. Such style specifications, for example, may specify styles for performing the identified gestures, e.g., through different starting positions, courses, speeds, ending positions and/or any other gesture parameters of the identified gesture. In some examples, style specifications may include ratings for degree of difficulties, degree of elegance, form, and/or any other aspects that may be used to determine a style for the user performance of the identified gesture. For example, style score may be assigned to a jab motion gesture performed by a user in a boxing game to judge different combination of timing, length, starting position, power of the jab motion gesture performed by the user (e.g., a higher style score may be given to a performance of a jab motion gesture by the user when the jab is delivered within a tighter area—i.e. the more punctuate the jab is delivered, the higher style score is for the jab).

Gesture metrics such as speed, direction, power, distance and so on may be determined by using geometry analysis on one or more gesture parameters. For example, distance of an identified gesture performed by a user may be computed by processing a starting position and an end position of the identified gesture performed by the user through a distance function; a speed of the identified gesture as performed by the user may be determined by dividing the computed distance with a time duration of the user performance; and so on.

It should be appreciated that gesture metrics module 112 may be configured to determine more than one gesture metric for a performance of an identified gesture by a user, e.g., an accuracy gesture metric, a precision gesture metric, a distance gesture metric and/or other gesture metrics may be determined simultaneously to quantify a sideway waving gesture performed by a user. It should also be appreciated that the above gesture metrics are described only for illustration purposes and thus not intended to be limiting.

In some examples, gesture metrics may include those metrics that are determined for multiple performances of identified gestures by users. Take user performance of sideway waving gestures as an example, average, mean, standard deviation and/or any other statistical analysis of accuracy, speed, distance, power, and so on may be determined for multiple performances of the sideway waving gesture by a user in different times.

In some examples, gesture metrics may include those metrics that are determined based on gesture parameters obtained for user physical actions in relation to one another. For example, gesture metrics such as stand and/or balance may be determined based on gesture parameters representing a basketball shooting motion (e.g., performed by a shooting hand of a user) in relation to gesture parameters represent a guiding motion concurrent to the shoot gesture (e.g., performed by a non-shooting hand of a user) to quantify a performance of a basketball shooting gesture by the user. In another example, where a user performs a golf swing, gesture metrics such as balance may be determined based on gesture parameters obtained from positions of golf club held by the user in relation to body part positions of the user.

The gesture-reward threshold module 114 may be configured to provide access to reward content in the virtual space based on gesture metrics determined by the gesture metrics module 112. Examples of reward content may include virtual items, virtual currency, virtual space controls, invitation to virtual space events, real-world items, real-world currency and/or any other reward content. Access to such reward content may be provided to a user based on a quality of the user's performance of an identified gesture as quantified by the gesture metrics determined by the gesture metrics module 112. The access to reward content may be so provided to the users independent of user development in the virtual space, e.g., not as a part of training requirements and/or requirements for user to advance in the virtual space. For example, virtual currency (e.g., gold) may be rewarded to a user upon a determination that the user performance of an identified gesture has achieved a precision, an accuracy, a speed, style rating and so on. For instance, 5 gold may be rewarded to a user upon a determination made by the gesture metrics module 112 that the user has achieved an 65% accuracy in performing an identified gesture; and 10 gold may be rewarded to the user upon a determination made by the gesture metrics module 112 that the user has achieved an 85% accuracy in performing the same identified gesture.

In some examples, upon determinations that a user performance of an identified gesture has achieved a quality as quantified by gesture metrics determined by gesture metrics module 112, new gestures may be associated with gesture commands to adjust virtual space controls dynamically. For example, in the case where a gesture command that instructs view transformation of virtual space and the gesture command is associated with a sideway waving gesture, upon a determination that a user has performed the sideway waving gesture with 95% accuracy as determined by the gesture metrics module 112, the gesture-reward module 114 may associate the gesture command of view transformation with a rotation gesture and dissociate the sideway waving gesture with the view transformation command. As so reconfigured, the gesture command, e.g., the view transformation command takes on a new control requiring a different gesture, e.g., the rotation gesture, than the one, e.g., the sideway waving gesture, that the user has mastered with a good accuracy. In some examples, gesture commands may be modified such that new controls provided by the virtual space may be more challenging for users. For example, in the case where a "duck" gesture command (e.g., when the gesture command executed, a user controlled character in the virtual space lower its body suddenly), upon a determination that a user has performed a finger swipe in a downward motion anywhere on a touch sensitive screen with a 98% accuracy and 100% precision as determined by gesture metrics module 112, the reward module 114 may reconfigure the "duck" gesture command such that the newly configured "duck" gesture command requires the user to perform a downward finger swipe in a specific area on the touch sensitive screen (e.g., on the right corner of the touch sensitive screen).

In some implementations, an access to reward content may be provided to a user responsive to a determination that a gesture metric determined for performance of an identified gesture by the user has breached a threshold. Such a threshold may correspond to, but not limited to, accuracy, average accuracy, a speed, an average speed, a number of correct gestures performed, a score, or an average score quantifying user performances of identified gestures. For example, access to reward content may be provided to a user when the user has performed a sideway waving gesture above a threshold of 95% accuracy for 3 times. In some examples, the threshold may correspond to a combination of gestures performed in relation to one another. For example, in the case where the user performs a basketball shot, a threshold may correspond to positions of shooting hand in relation to positions of non-shooting hand such that the shooting hand should apply a minimum force through a shooting gesture and the non-shooting hand should follow the shooting hand at a minimally balanced position through a non-shooting gesture. In that example, access to reward content may be provided to a user upon a determination that the user has performed the combination of the shooting and non-shooting gestures above those required by the threshold.

In some examples, different reward content may be provided to a user for breaching different thresholds in performing an identified gesture. For example, in the case where a user's performance of an identified gesture has breached a threshold of 80% accuracy, 5 gold, for example, may be provided to the user; and a rare virtual sword may be provided to the user has breached another threshold of 100% precision as compared to previous performances of the identified gesture.

The gesture-reward threshold module 116 may be configured to obtain one or more thresholds that may be used by the reward module 114 for providing access to reward content to users. In some examples, the thresholds may be determined by the provider, administrator, moderator, and/or any other entities related to the virtual space at a configuration stage of system 100 and/or at a run-time of system 100. In those examples, the thresholds may be stored in electronic storage included in the system 100, e.g., such as the electronic storage 122. In some other examples, the thresholds may be provided by third-party providers affiliated with the virtual space and may be obtained by importing from the third-party providers through any suitable medium provided by the third-party providers. In any case, the thresholds may be determined based on heuristic and/or statistical rules to establish targets for user performances of one or more gestures to interact with the virtual space. For example, such thresholds may be determined using statistical analysis on multiple individual users or user groups in the virtual space, and the statistical analysis may include regression analysis, time series analysis, projected probability, standard deviation and/or any other statistical analyses.

In some examples, the thresholds may be determined dynamically based on input provided by the provider, administrator, moderator, and/or any other entities related to the virtual space via a user interface. In some examples, reward thresholds may be determined on individual gesture basis according to gesture definitions for the individual gestures.

The server 102, client computing platforms 104, and/or external resources 120 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which servers 102, client computing platforms 104, and/or external resources 120 may be operatively linked via some other communication media.

A given client computing platform 104 may include one or more processors configured to execute computer program modules. The computer program modules may be configured to enable an expert or user associated with the given client computing platform 104 to interface with system 100 and/or external resources 118, and/or provide other functionality attributed herein to client computing platforms 104. By way of non-limiting example, the given client computing platform 104 may include one or more of a desktop computer, a laptop computer, a handheld computer, a tablet computing platform, a NetBook, a Smartphone, a gaming console, and/or other computing platforms.

External resources 118 may include sources of information, hosts and/or providers of virtual environments outside of system 118, external entities participating with system 100, and/or other resources. For example, the influence information module 108 may be configured to obtain the information indicating a user's influence in the virtual space from the external resources 118. In some implementations, some or all of the functionality attributed herein to external resources 118 may be provided by resources included in system 100.

Server 102 may include electronic storage 120, one or more processors 122, and/or other components. Server 102 may include communication lines, or ports to enable the exchange of information with a network and/or other computing platforms. Illustration of server 102 in FIG. 1 is not intended to be limiting. Server 102 may include a plurality of hardware, software, and/or firmware components operating together to provide the functionality attributed herein to server 102. For example, server 102 may be implemented by a cloud of computing platforms operating together as server 102.

Electronic storage 122 may comprise non-transitory storage media that electronically stores information. The electronic storage media of electronic storage 122 may include one or both of system storage that is provided integrally (i.e., substantially non-removable) with server 102 and/or removable storage that is removably connectable to server 102 via, for example, a port (e.g., a USB port, a firewire port, etc.) or a drive (e.g., a disk drive, etc.). Electronic storage 122 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 116 may include one or more virtual storage resources (e.g., cloud storage, a virtual private network, and/or other virtual storage resources). Electronic storage 122 may store software algorithms, information determined by processor 122, information received from server 102, information received from client computing platforms 104, and/or other information that enables server 102 to function as described herein.

Processor(s) 120 is configured to provide information processing capabilities in server 102. As such, processor 120 may include one or more of a digital processor, an analog processor, a digital circuit designed to process information, an analog circuit designed to process information, a state machine, and/or other mechanisms for electronically processing information. Although processor 120 is shown in FIG. 1 as a single entity, this is for illustrative purposes only. In some implementations, processor 120 may include a plurality of processing units. These processing units may be physically located within the same device, or processor 120 may represent processing functionality of a plurality of devices operating in coordination. The processor 120 may be configured to execute modules 106, 108, 110, 112, 114, 116 and/or other modules. Processor 120 may be configured to execute modules 106, 108, 110, 112, 114, 116 and/or other modules by software; hardware; firmware; some combination of software, hardware, and/or firmware; and/or other mechanisms for configuring processing capabilities on processor 120. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 106, 108, 110, 112, 114, 116 are illustrated in FIG. 1 as being implemented within a single processing unit, in implementations in which processor 122 includes multiple processing units, one or more of modules 106, 108, 110, 112, 114, 116 may be implemented remotely from the other modules. The description of the functionality provided by the different modules 106, 108, 110, 112, 114, 116 described below is for illustrative purposes, and is not intended to be limiting, as any of modules 106, 108, 110, 112, 114, 116 may provide more or less functionality than is described. For example, one or more of modules 106, 108, 110, 112, 114, 116 may be eliminated, and some or all of its functionality may be provided by other ones of modules 106, 108, 110, 112, 114, 116. As another example, processor 120 may be configured to execute one or more additional modules that may perform some or all of the functionality attributed below to one of modules 106, 108, 110, 112, 114, 116.

It should be appreciated that the above description of system 100 is merely illustrated as one example of a system configured to provide rewards to a user in a virtual space based on user performance of identified gestures in accordance with the disclosure. It should be appreciated that in some examples, a localized system 100 may be configured according to a stand-alone architecture such that the system configured to provide rewards to a user in a virtual space based on user performance of gesture may be localized. For example, the localized system 100 may comprise a processor the same as or similar to the processor 120, e.g., a CPU, a graphical processing unit (GPU), storage, memory, an I/O subsystem, and/or other components included the localized system 100. In those examples, the CPU 120 may be configured to communicate virtual space state information to the GPU through any suitable wired or wireless communications such as, but not limited to, a point-to-point communication link like a data bus included in the localized system 100. The GPU may be configured to determine representational view information for presenting instances of virtual space on one or more displays coupled to or included in the localized system 100. It should also be appreciated in some other examples, multiple localized systems 100 may be connected via any wired or wireless links according to a distributed architecture (e.g., peer to peer networks) such that the localized systems 100 may be configured to operate collectively to achieve all or some of the functionalities of 106, 108, 110, 112, 114, 116 as described above.

FIGS. 2A-C illustrate one example of providing rewards to user in a virtual space based on user performance of gestures. They will be described with references to FIG. 1. In FIG. 2A, at the time T, user controlled character 202 is running on an upper wall 203 in an instance of a virtual space presented on a client platform 104—a smartphone 104 with a touch screen in this example. As also shown in FIG. 2A, at time T, the user has 100 play points 206 as indicated at the up-right corner of the smartphone 104. As still shown in FIG. 2A, at time T, a user is about to perform a finger swipe on the touch screen of smart phone 104 starting at a position 204. FIG. 2B shows that at time T+1, the user has performed a downward finger swipe 210 started at position 204 and ended at position 208 on the touch screen of smartphone 104. As illustrated, the downward finger swipe 210 performed by the user caused the character 202 to perform a jump-down maneuver 232 onto a lower wall 205 in the virtual space. As shown, as a result of the finger swipe 210 performed by the user, 125 play points are rewarded to the user. The determination to reward the 125 points to the user for the user's performance the downward finger 210 will be described in further details in FIG. 2C.

FIG. 2C illustrates that the user performance of the downward finger swipe 210 is identified as a downward swipe gesture 224, e.g. by a gesture identification module the same as or similar to gesture identification module 108 (shown in FIG. 1 and described herein). As shown FIG. 2C, the identification of downward swipe gesture 224 may be facilitated by a downward swipe gesture definition that specifies a bounding box 222 with respect to a starting position 220 of a user finger swipe such that a user finger swipe having an end position within the bounding box 222 is identified as a downward swipe gesture 224. As also shown, multiple performances of finger swipes on the touch screen of smartphone 104 by the user, e.g., over a period ending at time T+1 have been identified as downward swipe gestures 224. Also shown in FIG. 2C is a gesture-command association table 230 between identified gestures and gesture commands. In this example, the identified user performance of the downward swipe gesture 224 may be used to determine a gesture command that specifies the jump-down maneuver 232 as performed by the character 232 in FIG. 2B, according to the gesture-command association table 230. This determination may be made by a gesture-command module the same as or similar to the gesture-command module 110 (shown in FIG. 1 and described herein).

As also shown in FIG. 2C, play points 214 may be determined for the user's performances of downward swipe gesture 224. As shown, the gesture metrics module 112, in this example, may be configured to determine a number of play points 214 according to, but not limited to, straightness and distance of a user performed downward gesture swipe 224. As shown, different number of play points have been awarded to different user performances of the downward swipe gesture 224 based on gesture metrics that quantify straightness and distance of user performed downward swipe gesture 224. As also shown, the user performance of the downward swipe gesture 224 at time T+1 is rewarded with 125 play points 214, as compared to other performances of the downward gestures 224 by the user.

Figure 3:
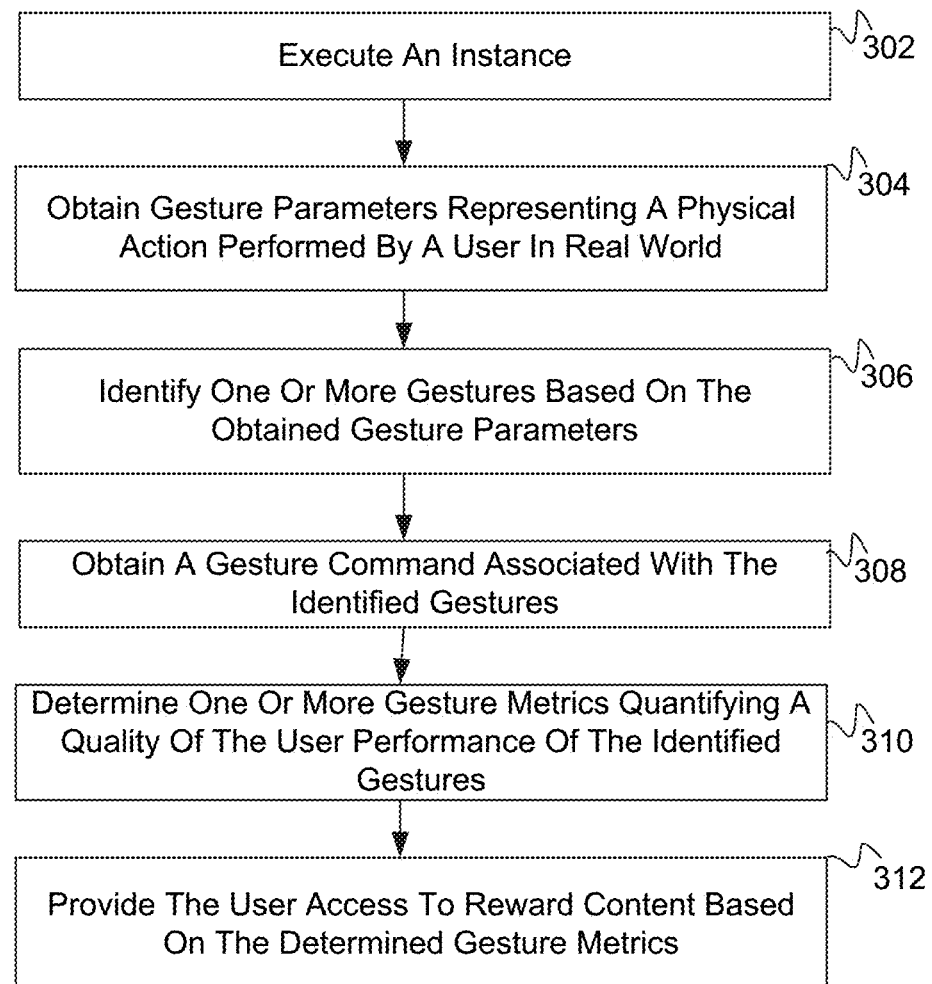
FIG. 3 illustrates one exemplary method of providing rewards to a user in a virtual space based on user performance of gestures.

FIG. 3 illustrates a method 300 of hosting a virtual space to client computing devices for interaction by users. The operations of method 300 presented below are intended to be illustrative. In some embodiments, method 300 may be accomplished with one or more additional operations not described, and/or without one or more of the operations discussed. Additionally, the order in which the operations of method 300 are illustrated in FIG. 3 and described below is not intended to be limiting.

In some embodiments, method 300 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 300 in response to instructions stored electronically on an electronic storage medium. The one or more processing devices may include one or more devices configured through hardware, firmware, and/or software to be specifically designed for execution of one or more of the operations of method 300.

At operation 302, an instance of a virtual space may be executed and implemented to determine view information for transmission to one or more client computing platforms associated with users. The users may participate in the virtual space by controlling entities therein. In some implementations, operation 302 may be performed by a space module the same as or similar to space module 106 (shown in FIG. 1 and described herein).

At operation 304, gesture parameters representing a physical action performed by a user in a real world may be obtained. In some implementations, operation 304 may be performed by a gesture identification module the same as or similar to gesture identification module 108 (shown in FIG. 1 and described herein).

At operation 306, gestures may be identified based on the gesture parameters obtained in operation 304. In some implementations, operation 306 may be performed by a gesture identification module the same as or similar to gesture identification module 108 (shown in FIG. 1 and described herein).

At operation 308, a gesture command associated the gestures identified in operation 306 may be obtained. In some implementations, operation 308 may be performed by a gesture-command module the same as or similar to gesture-command module 110 (shown in FIG. 1 and described herein).

At operation 310, gesture metrics quantifying a quality of the user's performance of the gestures identified in operation 306 may be determined. In some implementations, operation 310 may be performed by a gesture metrics module the same as or similar to gesture metrics module 112 (shown in FIG. 1 and described herein).

At operation 312, access to reward content may be provided to the user based on the gesture metrics determined in operation 310. In some implementations, operation 312 may be performed by a reward module 114 the same as or similar to reward module 114 (shown in FIG. 1 and described herein).

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured to provide rewards to a user in a virtual space based on user performance of a gesture, the system comprising:
    one or more processors configured by machine-readable instructions to:
    execute an instance of the virtual space, and to implement the instance of the virtual space to facilitate participation by users in the virtual space, wherein users participate in the virtual space by controlling virtual space elements by inputting commands that are executed in the virtual space;
    obtain gesture parameters that represent physical actions of the users in the real world, and to identify individual ones of multiple gestures performed by the users based on the obtained gesture parameters;
    determine gesture commands corresponding to the identified gestures such that responsive to a performance of a first action by a first user having gesture parameters that correspond to a first gesture such that the first action is identified as the first gesture, wherein a first gesture command that corresponds to the first gesture is determined and executed;
    determine a first gesture metric quantifying a quality of user performance of the first gesture, wherein the first gesture metric is determined based on the obtained gesture parameters for the first action;
    provide access for the first user to a first set of reward content in the virtual space based on the first gesture metric determined for the first user;
    determine whether the first gesture metric determined for performance of the first gesture by the first user breaches a first threshold; and
    associate a second gesture which is different than the first gesture with the first gesture command responsive to a determination that the first gesture metric determined for performance of the first gesture by the first user has breached the first threshold so that subsequent and responsive to such association, identification of the second gesture results in execution of the first gesture command, and
    provide, responsive to a determination that the first gesture metric determined for performance of the first gesture by the first user breaches a second threshold, a second set of reward content to the first user.

2. The system of claim 1, wherein the one or more processors are configured by machine-readable instructions such that the quality quantified by the first gesture metric for performance of the first gesture by the first user includes one or more of accuracy with respect to the first gesture, precision, speed, style, power, direction or duration.

3. The system of claim 1, wherein the one or more processors are configured by machine-readable instructions such that access to the first set of reward content is provided to the first user responsive to a determination that the first gesture metric determined for performance of the first gesture by the first user has breached the first threshold.

4. The system of claim 3, the further configured to obtain the first threshold.

5. The system of claim 3, wherein the first threshold corresponds to one or more of accuracy, average accuracy, a speed, an average speed, a number of correct gestures performed, a score, or an average score.

6. The system of claim 1, wherein the one or more processors are configured by machine-readable instructions such that the first set of reward content includes one or more: virtual items, virtual currency, virtual space controls, invitation to virtual space events, real-world items or real-world currency.

7. The system of claim 1, wherein the one or more processors are further configured by machine-readable instructions to:
  determine gesture commands corresponding to the identified gestures such that responsive to a performance of a third action by the first user having gesture parameters that correspond to a third gesture such that the third action is identified as the third gesture, wherein a third gesture command that corresponds to the third gesture is determined and executed;
  determine a third gesture metric quantifying a quality of user performance of the third gesture, wherein the third gesture metric is determined based on the obtained gesture parameters for the third action; and
  provide access for the first user to a third set of reward content in the virtual space based on the third gesture metric determined for the first user.

8. A method for providing rewards to a user in a virtual space based on user performance of a gesture, the method being implemented in one or more physical processors configured by machine-readable instructions, the method comprising:
  executing an instance of the virtual space, and to implement the instance of the virtual space to facilitate participation by users in the virtual space, wherein users participate in the virtual space by controlling virtual space elements by inputting commands that are executed in the virtual space;
  obtaining gesture parameters that represent physical actions of the users in the real world, and to identify individual ones of multiple gestures performed by the users based on the obtained gesture parameters;
  determining gesture commands corresponding to the identified gestures such that responsive to a performance of a first action by a first user having gesture parameters that correspond to a first gesture such that the first action is identified as the first gesture, wherein a first gesture command that corresponds to the first gesture is determined and executed in the virtual space;
  determining a first gesture metric quantifying a quality of user performance of the first gesture such that the first gesture metric is determined based on the obtained gesture parameters for the first action; and
  providing access for the first user to a first set of reward content in the virtual space based on the first gesture metric determined for the first user;
  determining whether the first gesture metric determined for performance of the first gesture by the first user breaches a first threshold; and
  associating a second gesture which is different than the first gesture with the first gesture command responsive to a determination that the first gesture metric determined for performance of the first gesture by the first user has breached the first threshold so that subsequent and responsive to such association, identification of the second gesture results in execution of the first gesture command; and
  providing a second set of reward content to the first user responsive to a determination that the first gesture metric determined for performance of the first gesture by the first user breaches a second threshold.

9. The method of claim 8, wherein the quality quantified by the first gesture metric for performance of the first gesture by the first user includes one or more of accuracy with respect to the first gesture, precision, speed, style, power, direction or duration.

10. The method of claim 8, wherein the access to the first set of reward content is provided to the first user responsive to a determination that the first gesture metric determined for performance of the first gesture by the first user has breached the first threshold.

11. The method of claim 10, further comprising obtaining the first threshold.

12. The method of claim 10, wherein the first threshold corresponds to one or more of accuracy, average accuracy, a speed, an average speed, a number of correct gestures performed, a score, or an average score.

13. The method of claim 8, wherein the first set of reward content includes one or more: virtual items, virtual currency, virtual space controls, invitation to virtual space events, real-world items or real-world currency.

14. The system of claim 8, further comprising
  determining gesture commands corresponding to the identified gestures such that responsive to a performance of a third action by the first user having gesture parameters that correspond to a third gesture such that the third action is identified as the third gesture, wherein a third gesture command that corresponds to the third gesture is determined and executed in the virtual space;
  determining a third gesture metric quantifying a quality of user performance of the third gesture such that the third gesture metric is determined based on the obtained gesture parameters for the third action; and
  providing access for the first user to a third set of reward content in the virtual space based on the third gesture metric determined for the first user.

* * * * *